May 14, 1963  A. J. C. FORSYTH  3,089,618
LIQUID MEASURING AND DISPENSING MACHINE
Filed Aug. 30, 1960   3 Sheets-Sheet 1

INVENTOR.
ALBERT J.C. FORSYTH
BY
Knox & Knox

May 14, 1963 A. J. C. FORSYTH 3,089,618
LIQUID MEASURING AND DISPENSING MACHINE
Filed Aug. 30, 1960 3 Sheets-Sheet 2

INVENTOR.
ALBERT J.C. FORSYTH
BY
Knox & Knox

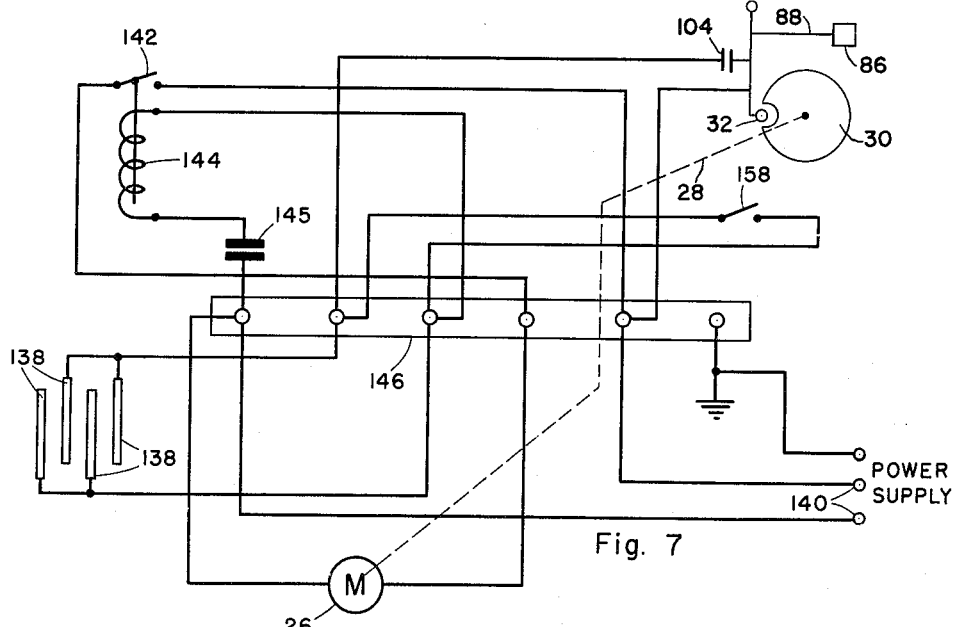
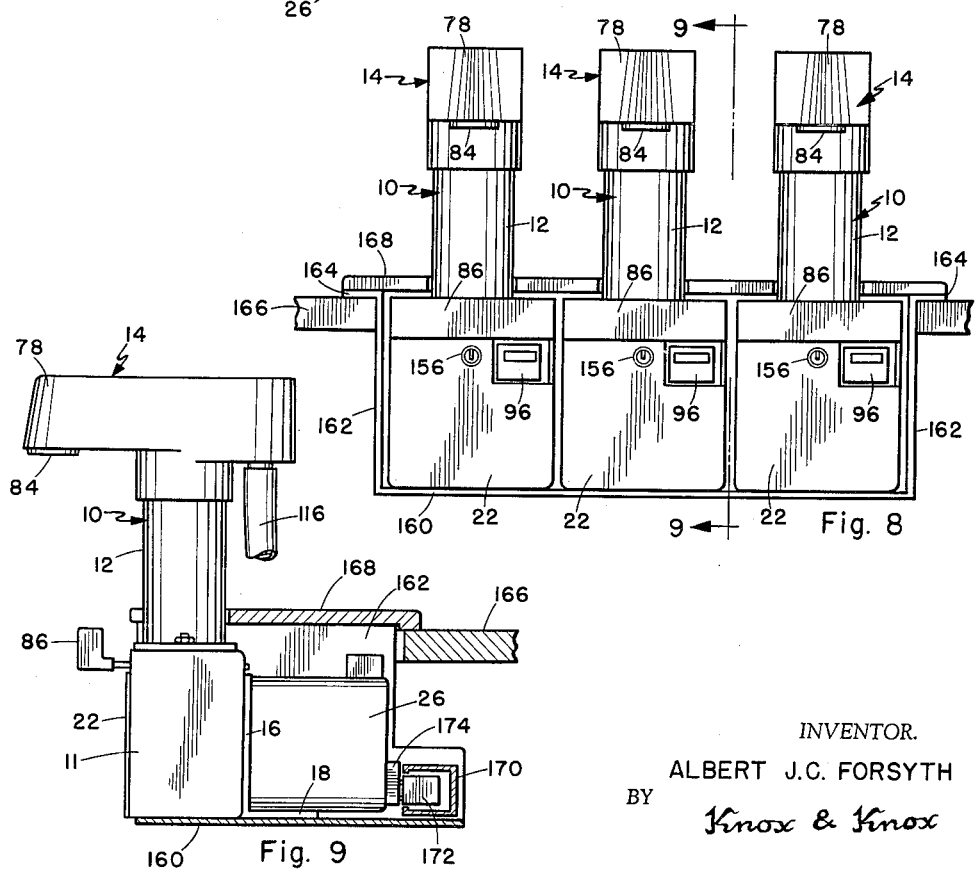

United States Patent Office 3,089,618
Patented May 14, 1963

3,089,618
LIQUID MEASURING AND DISPENSING
MACHINE
Albert J. C. Forsyth, Coronado, Calif., assignor to Courtesy Products Corporation, San Diego, Calif., a corporation of California
Filed Aug. 30, 1960, Ser. No. 52,995
2 Claims. (Cl. 222—60)

The present invention relates generally to dispensing equipment and more particularly to a liquid measuring and dispensing machine.

The primary object of this invention is to provide a machine which dispenses a measured quantity of liquid by operation of a switch bar which is in a position to be actuated by a receptacle held in place to receive the liquid, the machine having a fixed cycle of operation and being automatically shut off after one complete cycle.

Another object of this invention is to provide a liquid dispensing machine which recharges a measured chamber during the last part of each cycle and is thus ready for instant delivery upon initiation of the next cycle.

Another object of this invention is to provide a liquid dispensing machine having means for adjustment to deliver a consistently accurate measure of liquid within the capacity of the machine.

Another object of this invention is to provide a liquid dispensing machine utilizing a liquid reservoir having means to detect the level of liquid therein and prevent operation of the machine when the liquid is below a predetermined minimum level, the reservoir being suitable for installation adjacent to or remote from the machine, as required.

A further object of this invention is to provide a liquid dispensing machine which is tamper proof and records each operation to facilitate a check on the quantity of liquid dispensed.

Still another object of this invention is to provide a liquid dispensing machine which is compact, self-contained and easily accessible for servicing when necessary.

Finally, it is an object to provide a liquid dispensing machine of the aforementioned character which is simple and convenient to manufacture and install and which will give generally efficient and durable service.

Figure 1:
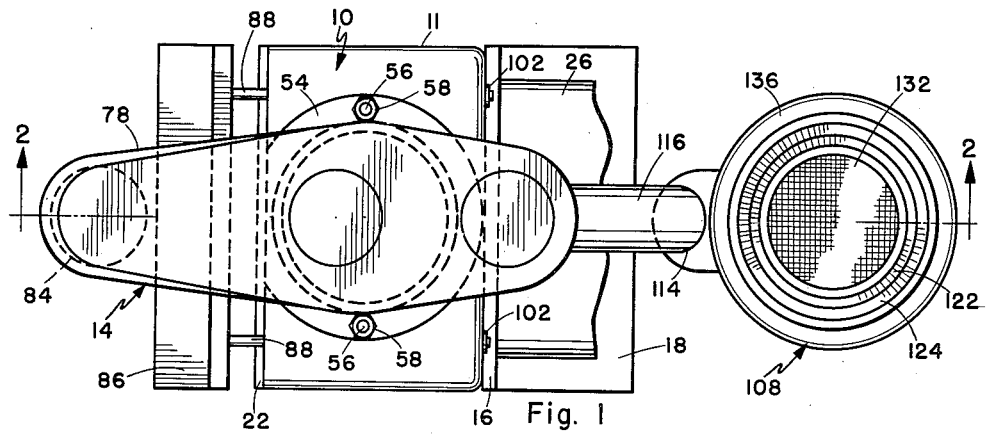
Figure 2:
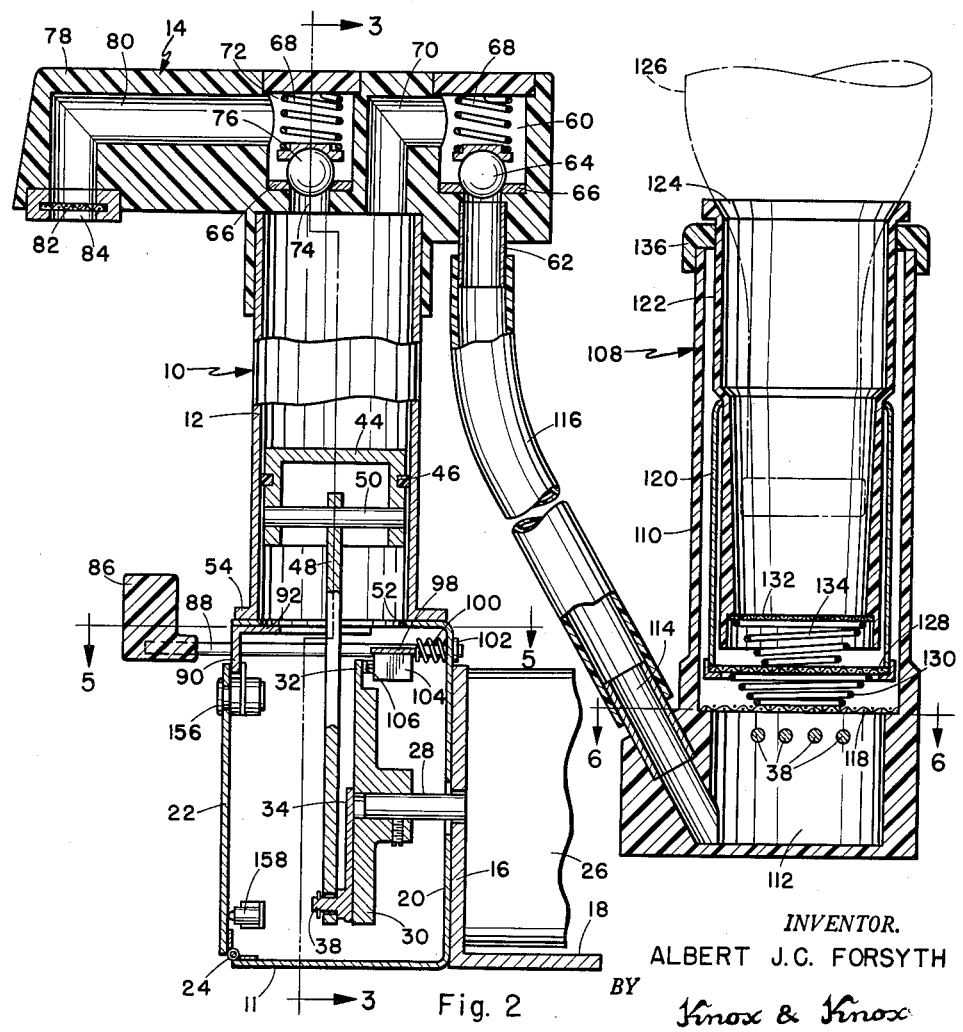
Figure 3:
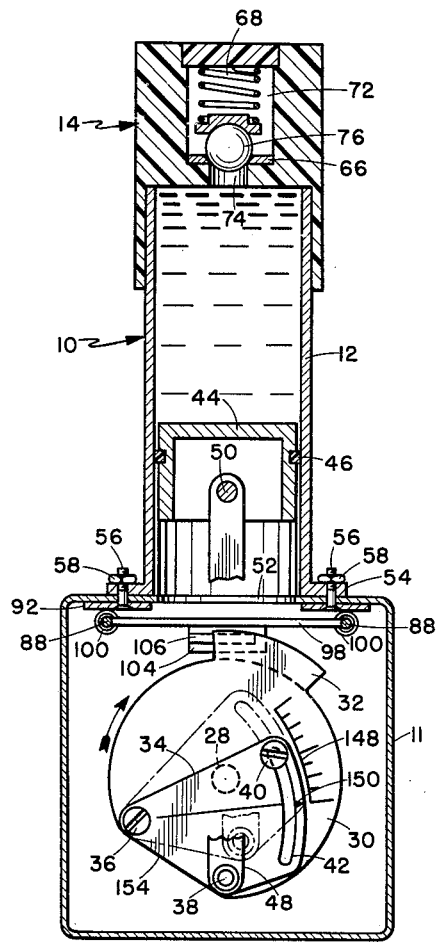
Figure 4:
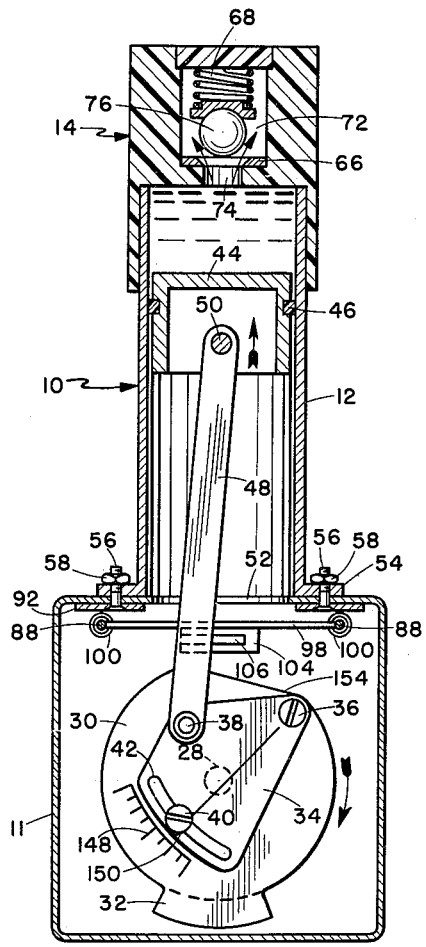
Figure 5:
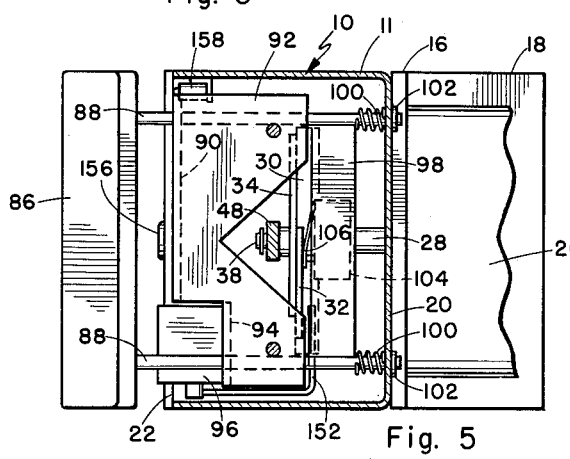
Figure 6:
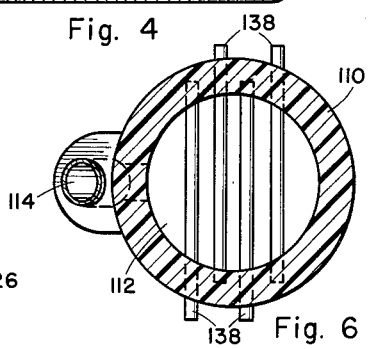

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a top plan view of the machine;
FIGURE 2 is a sectional view taken on the line 2—2 of FIGURE 1;
FIGURE 3 is a sectional view taken on the line 3—3 of FIGURE 2;
FIGURE 4 is a sectional view similar to FIGURE 3, but showing the mechanism approximately half-way through a cycle;
FIGURE 5 is a sectional view taken on the line 5—5 of FIGURE 2;
FIGURE 6 is a sectional view taken on the line 6—6 of FIGURE 2;
FIGURE 7 is a schematic wiring diagram of the machine;
FIGURE 8 is a front elevation view, on a reduced scale, of a multiple installation of the machines in a counter top; and
FIGURE 9 is a sectional view taken on the line 9—9 of FIGURE 8.

Similar characters of reference indicate similar or identical elements and portions throughout the specification and throughout the views of the drawing.

Referring now to FIGURES 1–6 of the drawings, the machine includes a pump assembly 10 having a casing 11 on which is an upright cylinder 12 carrying a delivery head 14, the casing being fixed to a bracket 16 having a base flange 18 for attachment to a suitable supporting surface. The casing 11 is generally rectangular and has a back plate 20 which is fixed to the bracket 16, the front of said casing being fitted with a door 22 attached at its lower edge by a hinge 24. Secured to the rear of bracket 16 is a motor 26 suitably geared to provide a slow rotary motion of its drive shaft 28, about one or two seconds per revolution being practical. The drive shaft 28 extends into the casing 11 and carries a cam disc 30 having a radially extending cam lobe 32 on a portion of its periphery. On the front face of cam disc 30 is a crank plate 34 pivotally held at one end by a stud 36 adjacent the edge of the cam disc, said crank plate having thereon a crank pin 38 projecting forwardly parallel to the axis of drive shaft 28. The other end of the crank plate 34 is secured by a lock screw 40 through an arcuate slot 42 in the plate, so that by swinging the crank plate about stud 36 the crank pin 38 is adjusted radially to vary the effective stroke, as indicated in broken line in FIGURE 3.

The cylinder 12 is of constant bore and contains a piston 44 having a piston ring 46, said piston being pivotally attached to a connecting rod 48 by a wrist pin 50, the other end of the connecting rod extending through an opening 52 in the top of casing 11 and being attached to crank pin 38. The lower end of the cylinder 12 has a flange 54 with which the cylinder is attached to casing 11 by means of screws 56 and nuts 58.

The delivery head 14 may be a unitary plastic molding and has an inlet chamber 60 with an inlet sleeve 62, said inlet chamber containing a valve element 64, indicated as a ball, resting in a valve seat 66 and held closed by a spring 68, a transfer passage 70 connecting the inlet chamber with cylinder 12. Also in the delivery head 14 is an outlet chamber 72 connected to cylinder 12 by an outlet port 74 and containing a valve element 76, with a further valve seat 66 and spring 68. The delivery head 14 is elongated with the inlet portion at the rear of cylinder 12 and has a forwardly extended spout portion 78 in which is a delivery passage 80 from the outlet chamber 72, said delivery passage being fitted with an end filter screen 82 mounted in a downwardly directed nozzle 84.

The mechanism is operated by a push bar 86 mounted on a pair of horizontally spaced slide rods 88 passing through the casing 11 generally parallel to the axis of drive shaft 28 and disposed above the cam disc 30. The rear ends of slide rods 88 are slidable through the back plate 20, the forward portions being supported by the depending flange 90 of a support bracket 92, which is fixed inside casing 11 by the screws 56, said flange having an inwardly offset portion 94 which carries a counter 96, to be described hereinafter. Fixed between the slide rods 88 rearwardly of connecting rod 48 is a cross bar 98 and, between said cross bar and back plate 20, a small compression spring 100 is fitted on each slide rod to bias push bar 86 forwardly, said slide rods having snap rings 102 on their rear ends outside the casing 11 to retain the assembly. Suspended from the cross bar 98 is an actuating switch 104 having an operating arm 106 which bears against the rear of the cam lobe 32, said switch being normally off when the operating arm is so depressed.

The liquid to be dispensed is obtained from a reservoir assembly 108, comprising an upright cylindrical container 110 having a lower supply chamber 112 with an outlet 114, from which a hose 116 extends to the inlet sleeve 62. Above the supply chamber 112 is a screen 118 to prevent the entry of foreign matter. Fitted into the container 110 is an outer sleeve 120 in which is mounted an axially slidable inner sleeve 122, the upper end of said inner sleeve projecting above the container and having a mouth portion 124 to receive the neck of an inverted bottle 126, indicated in broken line in FIGURE 2. Fixed in the lower end of the outer sleeve 120 is a screen 128 and fitted between said screen and the screen 118 is a compression type ejection spring 130 to eject the sleeves from the container. In the lower end of the inner sleeve 122 is a further screen 132, under which is a separator spring 134 resting on screen 128, to cause separation of the two sleeves. Fitted around the upper end of the inner sleeve 122 is a cap ring 136 which seats on the upper end of container 110 and retains the assembly.

Extending across the supply chamber 112 are spaced pairs of electrically conductive probes 138, which are sealed to the chamber to prevent leakage. The probes 138 are connected into the electrical circuit, illustrated in FIGURE 7, in such a manner that a minimum quantity of liquid is necessary in the supply chamber 112 to complete a circuit between pairs of the probes in order to operate the mechanism. Power is supplied from power terminals 140, through the moving contact 142 of a relay 144, to drive the motor 26, the relay being coupled in a circuit through the probes 138, so that the contact can be closed only when liquid is present in the supply chamber 112. Due to the voltage drop caused by the resistance of the liquid between the probes 138, a boost may be needed to operate the relay 144 properly and this may be obtained by means of a capacitor 145 between the relay coil and the power supply, the charge stored assisting to actuate the relay when the circuit is initiated. The wiring is illustrated as connected through a junction block 146, for convenience, but may be arranged in any conventional manner according to requirements and particular components.

The actuating switch is connected between the power terminals and probes to initiate the operation when the push bar 86 is pressed inwardly. This action releases the arm 106 of switch 104 from the cam lobe 32 and starts the motor 26, so turning the cam disc 30 and displacing the lobe from the vicinity of said switch.

The first part of the cycle raises the piston 44 to eject liquid from the cylinder 12, out through nozzle 84, a receptacle held against the push bar 86 being in a position to receive the liquid. The second part of the cycle lowers the piston 44, drawing more liquid into cylinder 12 from the supply chamber 112, the quantity of liquid being dependent on the radial offset of crank pin 38. To facilitate accurate measurement a scale 148 may be marked on the face of cam disc 30 and an arrow 150, or similar mark, placed on the crank plate 34 to indicate the effective cylinder intake volume at any setting. As the cam disc 30 reaches the initial or starting position, the lobe 32 once more engages the switch arm 106 and breaks the circuit to complete one cycle, the push bar 86 having already been released since all of the liquid is dispensed in the first part of the cycle.

In order to keep a record of liquid dispensed, the counter 96, which is a conventional totalizer type device, has an actuating arm 152 extending rearwardly and inwardly to rest on the periphery of cam disc 30 behind the lobe 32. The cam disc 30 is provided with a flat portion 154 which allows the actuating arm to drop once for each revolution and advance the totalizing means by one unit.

The door 22 is fitted with a conventional lock 156 engaging the flange 90, to prevent unauthorized changes of delivery capacity, the door being cut away to clear the counter 96, which is thus visible at all times. As an added safeguard a safety switch 158 may be attached to one side of the casing 11 to be actuated by closing the door 22, so that when the door is open the machine is inoperative.

In a complete installation the machine may be used in multiple, as in FIGURES 8 and 9, three machines being illustrated as mounted in a cradle 160 having upright end walls 162, the upper edges of which have flanges 164 for attachment to a counter 166, or similar supporting surface. The assembly may be partially enclosed by a cover plate 168 cut to fit around the cylinders 12 and attached to the counter 166 as a top cover. At the rear of the cradle 160 is a longitudinal channel 170 containing a plurality of electrical sockets 172, each to receive a plug 174 attached to the rear of each motor 26. Thus the machines are simply plugged into place and are easily removable. The wiring to the multiple machines is conventional and can be enclosed in the channel 170. The reservoir assemblies 108 may be mounted in any suitable position, such as on a shelf below the counter 166, the only limitation on their location being accessibility for replacing bottles 126 when empty. With this arrangement the counters 96 are readily visible in a row and the push bars 86 may be labeled to indicate the particular beverage being dispensed.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:
1. A liquid measuring and dispensing machine, comprising: a casing; a pump assembly on said casing; said pump assembly having a cylinder with a piston reciprocally slidable therein; said cylinder having an inlet and an outlet; a liquid reservoir connected to said inlet; a motor, a cam disc in said casing and operatively connected to said motor; a crank plate mounted on said cam disc and pivotally attached at one end adjacent the periphery of the cam disc; lock means securing the other end of said crank plate to said cam disc; a crank pin on said crank plate; said piston being coupled to said crank pin; said crank plate being adjustable to vary the effective throw of said crank pin; a switch controlling said motor; said cam disc having extended cam means engageable with said switch to hold the switch in off position; a push operated actuating member mounted for limited movement in said casing; said switch being mounted on said actuating member, whereby shifting of the actuating member in one direction releases said switch from said cam means; liquid level sensing means in said reservoir; said sensing means being connected between said switch and said motor to prevent operation of the motor when the liquid in said reservoir is below a predetermined level.

2. A liquid measuring and dispensing machine, comprising: a casing; a pump assembly on said casing; said pump assembly having a cylinder having an inlet and an outlet; a liquid reservoir connected to said inlet; a piston reciprocally slidable in said cylinder; a motor; a cam disc mounted in said casing and operatively connected to said motor; a crank plate in the form of a sector of a circle mounted on said cam disc with the apex of said sector cam disc pivotally attached to said cam disc adjacent the periphery of the cam disc; lock means, comprising an arcuate slot adjacent the arcuate end of said crank plate and a lock screw, for securing the arcuate end of said crank plate to said cam disc in a given position; an arcuate scale positioned on said crank plate adjacent the arcuate end of said crank plate; an indicator positional on said arcuate end of said crank plate to indicate the position of said crank plate relative to said scale; a crank pin mounted on said crank plate intermediate the apex and arcuate end thereof; means for coupling said piston to said crank pin, said crank plate being thereby made adjustable in respect to said scale to vary the effective throw of said crank pin and thus vary the the movement of said piston and the quantity of liquid dispensed; a push operated actuating member mounted for limited back-and-forth movement in said casing; switch means for controlling said motor mounted on said actuating member; means comprising an extending cam lobe, positioned on said cam disc for holding said switch in an off condition, whereby shifting of the actuating member in one direction releases said switch from said cam means and permits said motor to be energized, and when said cam lobe completes one revolution it returns said switch to its off condition; liquid level sensing means comprising a pair of substantially parallel electrodes immersed into the liquid of said reservoir; said sensing means being connected so that electricity flows between said electrodes when there is sufficient liquid in said reservoir, and so permits operation of said dispensing machine.

References Cited in the file of this patent

UNITED STATES PATENTS

| | | |
|---|---|---|
| 878,750 | Schmidt | Feb. 11, 1908 |
| 1,834,765 | Brahy | Dec. 1, 1931 |
| 2,548,241 | Reynolds et al. | Apr. 10, 1951 |
| 2,952,209 | Scholin | Sept. 13, 1960 |